United States Patent
Hay et al.

(10) Patent No.: US 9,514,025 B2
(45) Date of Patent: Dec. 6, 2016

(54) MODELING MEMORY USE OF APPLICATIONS

(71) Applicant: International Business Machines Corporation, Armonk, NY (US)

(72) Inventors: Roee Hay, Haifa (IL); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/686,893

(22) Filed: Apr. 15, 2015

(65) Prior Publication Data
US 2016/0306641 A1 Oct. 20, 2016

(51) Int. Cl.
G06F 11/36 (2006.01)
G06F 9/44 (2006.01)
G06F 9/455 (2006.01)

(52) U.S. Cl.
CPC ............ G06F 11/3608 (2013.01); G06F 8/75 (2013.01); G06F 9/45525 (2013.01); G06F 11/36 (2013.01)

(58) Field of Classification Search
CPC ... G06F 11/3608; G06F 11/3672; G06F 11/36; G06F 8/75
See application file for complete search history.

(56) References Cited

U.S. PATENT DOCUMENTS

| | | | |
|---|---|---|---|
| 7,673,181 B1 * | 3/2010 | Lindo | G06F 11/3612 714/38.13 |
| 7,747,985 B2 * | 6/2010 | Campbell | G06F 11/36 717/127 |
| 8,359,578 B2 | 1/2013 | Wang et al. | |
| 8,413,122 B2 | 4/2013 | Dragicevic et al. | |
| 8,561,029 B2 | 10/2013 | Sinha et al. | |
| 8,601,457 B1 * | 12/2013 | Han | G06F 11/3608 717/154 |
| 9,110,680 B1 * | 8/2015 | Boynes | G06F 11/36 |
| 2002/0129343 A1 * | 9/2002 | Pinter | G06F 8/434 717/140 |
| 2005/0166167 A1 * | 7/2005 | Ivancic | G06F 11/3608 703/22 |
| 2005/0246402 A1 * | 11/2005 | Wu | G06F 12/0223 |

(Continued)

OTHER PUBLICATIONS

Černý et al., Model checking of linearizability of concurrent list implementations, [Online] Jul. 2010, In Computer Aided Verification, Springer Berlin Heidelberg, [Retrieved from the Internet] <http://link.springer.com/chapter/10.1007/978-3-642-14295-6_41> pp. 465-479.*

(Continued)

*Primary Examiner* — Thuy Dao
*Assistant Examiner* — Ravi K Sinha
(74) *Attorney, Agent, or Firm* — Gregory M. Nordstrom (57) ABSTRACT

A method includes receiving a program code at a processor. The method also includes generating, via the processor, a heap model corresponding to the program code. The method further includes detecting, via the processor, a linearizable data structure in the program code. The method also further includes modifying, via the processor, the heap model based on the detected linearizable data structure. The method also further includes analyzing, via the processor, the program code using the modified heap model.

15 Claims, 6 Drawing Sheets

(56) References Cited

U.S. PATENT DOCUMENTS

| | | | | |
|---|---|---|---|---|
| 2006/0247907 | A1* | 11/2006 | Qadeer | G06F 11/3608 703/22 |
| 2008/0005208 | A1* | 1/2008 | Vaswani | G06F 11/3466 |
| 2008/0281563 | A1* | 11/2008 | Ganai | G06F 11/3608 703/2 |
| 2009/0125887 | A1* | 5/2009 | Kahlon | G06F 11/3608 717/126 |
| 2010/0023926 | A1* | 1/2010 | Sugawara | G06F 8/75 717/120 |
| 2010/0229159 | A1* | 9/2010 | Odaira | G06F 11/3636 717/128 |
| 2010/0287538 | A1* | 11/2010 | Soundararajan | G06F 11/3624 717/128 |
| 2010/0293530 | A1* | 11/2010 | Ivancic | G06F 11/3608 717/126 |
| 2010/0305919 | A1* | 12/2010 | Ganai | G06F 11/3608 703/2 |
| 2011/0078511 | A1* | 3/2011 | Sinha | G06F 11/3604 714/38.1 |
| 2011/0113285 | A1* | 5/2011 | Dolby | G06F 11/3608 714/28 |
| 2011/0184705 | A1* | 7/2011 | Ganai | G06F 11/3608 703/2 |
| 2011/0302559 | A1* | 12/2011 | Naik | G06F 11/3608 717/124 |
| 2012/0011492 | A1* | 1/2012 | Sinha | G06F 11/3608 717/132 |
| 2012/0246662 | A1* | 9/2012 | Vechev | G06F 11/3608 718/107 |
| 2012/0297371 | A1* | 11/2012 | Greifeneder | G06F 11/3495 717/128 |
| 2012/0304158 | A1* | 11/2012 | Li | G06F 8/75 717/132 |
| 2014/0096112 | A1* | 4/2014 | DeLine | G06F 8/75 717/125 |
| 2014/0096248 | A1* | 4/2014 | Hay | G06F 21/561 726/23 |
| 2014/0130154 | A1* | 5/2014 | Dolby | G06F 21/577 726/22 |
| 2014/0189256 | A1* | 7/2014 | Kranich | G06F 11/36 711/147 |

OTHER PUBLICATIONS

Khurshid et al., Generalized symbolic execution for model checking and testing. [Online] 2003, International Conference on Tools and Algorithms for the Construction and Analysis of Systems, Springer Berlin Heidelberg, [Retrieved from the Internet] <http://link.springer.com/chapter/10.1007/3-540-36577-X_40#page-1> pp. 553-568.*

James C. Corbett, Constructing compact models of concurrent Java programs, [Online] 1998, In Proceedings of the 1998 ACM SIGSOFT international symposium on Software testing and analysis (ISSTA '98), Will Tracz (Ed.). ACM, New York, NY, USA, <http://dx.doi.org/10.1145/271771.271778> pp. 1-10.*

Praun et al., Static conflict analysis for multi-threaded object-oriented programs, [Online] 2003 in Proceedings of the ACM SIGPLAN 2003 conference on Programming language design and implementation (PLDI '03). ACM, New York, NY, USA, [Retrieved from the Internet] <http://dx.doi.org/10.1145/781131.781145> pp. 115-128.*

Hay, et al., "Modeling Memory Use of Applications", U.S. Appl. No. 14/734,179, filed Jun. 9, 2015.

List of IBM Patents or Patent Applications Treated as Related.

Burckhardt, et al., "Line-Up: A Complete and Automatic Linearizability Checker", PLDI'10, Jun. 5-10, 2010, Toronto, Ontario, Canada. Copyright 2010. ACM 978-1-4503-0019/10/06. 11 pages.

Golan-Gueta, et al., "Concurrent Libraries with Foresight", PLDI '13: Proceedings of the 34th ACM SIGPLAN conference on Programming Language Design and Implementation. Jun. 2013. 17 pages.

Herlihy, et al., "Linearizability: A Correctness Condition for Concurrent Objects", ACM Transactions of Programming Languages and Systems, vol. 12, No. 3, Jul. 1990. pp. 463-492.

Herlihy, et al., "Transactional Boosting: A Methodology for Highly-Concurrent Transactional Objects", PPoPP'08, Feb. 20-23, 2008, Salt Lake City, Utah, USA. 9 pages. Copyright ACM 2008.

Shacham, "Verifying Atomicity of Composed Concurrent Operations", Thesis paper, Tel-Aviv University. Aug. 2012. 137 pages.

Tripp, et al., "TAJ: Effective Taint Analysis of Web Applications", PLDI'09, Jun. 15-20, 2009, Dublin, Ireland. 11 pages. Copyright ACM 2009.

Tripp, et al., "ANDROMEDA: Accurate and Scalable Security Analysis of Web Applications", FASE'13: Proceedings of the 16th International Conference on Fundamental Approaches to Software Engineering. Mar. 2013. 16 pages.

Tripp, et al., "HAWKEYE: Effective Discovery of Dataflow Impediments to Parallelization", OOPSLA'11, Oct. 22-27, 2011, Portland, Oregon, USA. 17 pages. Copyright ACM 2011.

Mell, et al., "The NIST Definition of Cloud Computing", National Institute of Standards and Technology, Special Publication 800-145. Sep. 2011. 7 pages.

* cited by examiner

MODELING MEMORY USE OF APPLICATIONS

BACKGROUND

The present techniques relate to modeling memory use of a program code, and more specifically, to modeling memory use of a program code for use in static analysis.

SUMMARY

According to an embodiment described herein, a system can include a processor. The processor can receive a program code. The processor can also generate a heap model corresponding to the program code. The processor can also further detect a linearizable data structure in the program code. The processor can also further modify the heap model based on the detected linearizable data structure. The processor can further analyze the program code using the modified heap model.

According to another embodiment described herein, a method can include receiving a program code at a processor. The method can also include generating, via the processor, a heap model corresponding to the program code. The method can also further include detecting, via the processor, a linearizable data structure in the program code. The method can also include modifying, via the processor, the heap model based on the detected linearizable data structure. The method can further also include analyzing, via the processor, the program code using the modified heap model.

According to another embodiment described herein, a computer program product for testing an application can include a computer-readable storage medium having computer readable instructions embodied therewith, wherein the computer readable storage medium is not a transitory signal per se. The computer readable instructions can be executable by a processor to cause the processor to receive a program code. The computer readable instructions can also cause the processor to generate a heap model corresponding to the program code. The computer readable instructions can further also cause the processor to detect a linearizable data structure in the program code. The computer readable instructions can also cause the processor to modify the heap model based on the detected linearizable data structure. The computer readable instructions can also cause the processor to save the modified heap model to a new file. The computer readable instructions can also cause the processor to analyze the program code statically using the modified heap model.

DETAILED DESCRIPTION

Linearizability is a correctness condition for concurrent objects that provides an illusion that an operation applied to the object takes effect instantaneously at some point between its invocation and its response. Linearizability implies that a concurrent operation can be defined by pre and post conditions. A concurrent object is considered linearizable if any execution of its operations is equivalent to a "legal" sequential execution that preserves the order between non-overlapping operations.

Static data-flow analysis is the general name assigned to analysis techniques that track flow of data throughout a given program based on its code. Static data-flow analysis can be performed in many ways. A common characteristic of these methods are that they model unbounded memory as some finite representation. For example, a heap memory may be potentially unbounded and therefore can be abstracted into a model. This model enables tracking how data is read and written via local variables and heap updates, which induces an approximate model of data flow. For example, two ways of modeling heap memory for the purpose of data-flow analysis include the use of allocation sites and access paths. As used herein, an allocation site refers to a statement in program code that allocates an object. As used herein, an access path refers to a local variable, which is followed by a sequence of field identifiers, which together describe a heap object. In the first method, modeling runtime heap objects as allocation sites limits the size of the "static" heap to the number of allocation sites in the program. A static heap is a heap that is bounded in size. In the second example, static data-flow analysis may be performed by tracking heap locations symbolically as access paths. The access paths can denote relevant data-flow paths as strings consisting of local variables and then 0 or more field identifiers. A field identifier, as used herein, refers to a fully qualified name of a field. An internal field is a field within a data structure. For example, an internal field can include a field pointing to the array of key/value pairs inside a map object. Tracking the flow of data at the level of internal fields and methods can result in significant performance degradation and loss of accuracy. For example, scanning of the program code at the internal field level may use up significant resources. Tracking data flow through internal fields may also result in the loss of accuracy.

According to techniques of the present disclosure, the linearizability of data structures within a program code is used to simplify a heap model corresponding to the code into a simplified heap model that can be analyzed more efficiently. Linearizability leads to a notion of encapsulation. Encapsulation, as used herein, refers to the process of combining code and/or data together into a single unit. Because memory "owned" by a linearizable data structure cannot be observed by other objects, encapsulation is useful to data-flow analysis. Memory can be "owned" by the linearizable data structure such that data stored in a heap is exclusively accessed by the linearizable data structure. In some examples, data flow through a linearizable data structure can thus be modeled and tracked in terms of the data structure's interface rather than its implementation. For example, the allocation sites and/or access paths of a linearizable data structure may be limited to the interface of the linearizable data structure. Moreover, in terms of heap modeling, the present techniques provide saving of resources. For allocation sites, memory allocated within a linearizable data structure instance is not explicitly modeled, which results in resource savings. For the access-path representation technique, memory manipulated within an instance is not modeled, also resulting in resource savings. An instance, as referred to herein, includes an object and may be also interchangeably referred to as an object.

In some scenarios, the techniques described herein may be implemented in a cloud computing environment. As discussed in more detail below in reference to at least FIGS. 1, 5, and 6, a computing device configured to generate and analyze heap models may be implemented in a cloud computing environment. It is understood in advance that although this disclosure may include a description on cloud computing, implementation of the teachings recited herein are not limited to a cloud computing environment. Rather, embodiments described herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. In some embodiments, this cloud model includes at least five characteristics, at least three service models, and at least four deployment models.

The example characteristics in some embodiments are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and improve resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. Cloud computing includes an infrastructure comprising a network of interconnected nodes.

Figure 1:
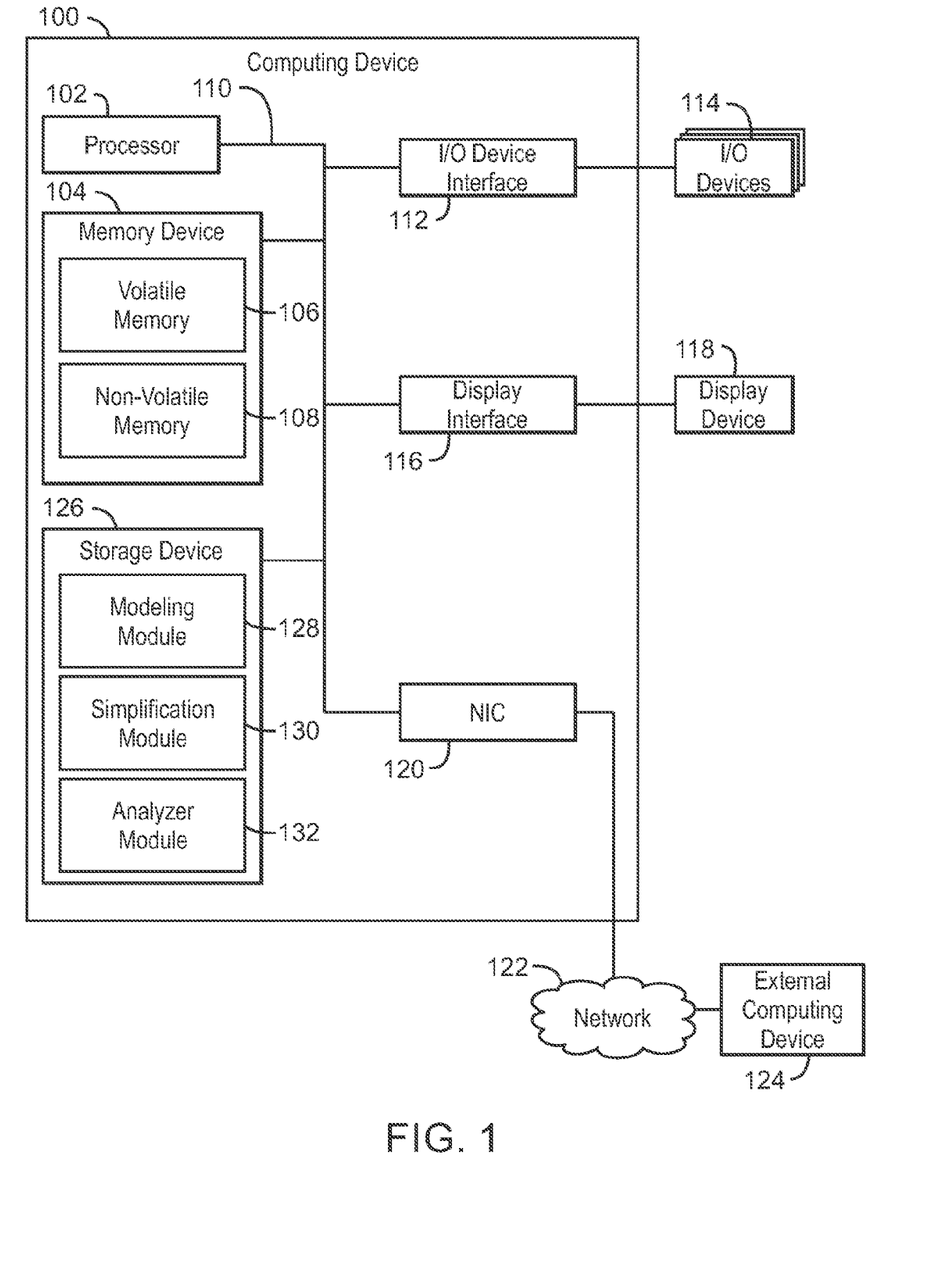
FIG. 1 is block diagram of an example computing device that can model heaps based on linearizable program code.

With reference now to FIG. 1, an example computing device can model heaps based on linearizable program code. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a singlecore processor, multi-core processor, computing cluster, or any number of other configurations. The memory 104 can include volatile memory 106 and non-volatile memory 108. Volatile memory 106 includes memory that requires power to maintain stored information, such as random access memory (RAM) or cache memory. Non-volatile memory 108 can include all other forms of memory, including read only memory, flash memory, or any other suitable memory systems.

The processor 102 may be connected through a system interconnect 110 (e.g., PCI®, PCI-Express®, etc.) to an input/output (I/O) device interface 108 adapted to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 101, or may be devices that are externally connected to the computing device 100.

The processor 102 may also be linked through the system interconnect 110 to a display interface 116 adapted to connect the computing device 100 to a display device 118. The display device 118 may include a display screen that is a built-in component of the computing device 100. The display device 118 may also include a computer monitor, television, or projector, among others, that is externally connected to the computing device 100. In addition, a network interface controller (NIC) 120 may be adapted to connect the computing device 100 through the system interconnect 110 to the network 122. In some embodiments, the NIC 120 can transmit data using any suitable interface or protocol, such as the internet small computer system interface, among others. The network 122 may be a cellular network, a radio network, a wide area network (WAN), a local area network (LAN), or the Internet, among others. An external computing device 124 may connect to the computing device 100 through the network 122. In some examples, external computing device 124 may be an external webserver 124. In some examples, external computing device 124 may be a cloud computing node.

The processor 102 may also be linked through the system interconnect 110 to a storage device 126 that can include a hard drive, an optical drive, a USB flash drive, an array of drives, or any combinations thereof. In some examples, the storage device may include a modeling module 128, a simplification module 130, and an analyzer module 132. For example, the modules may be included in an application such as a compiler or a program analysis tool. The modeling module 128 can receive a program code and create a model of the program code for purposes of analysis. For example, the modeling module 128 can model a representation of the associated heap of a program code.

Still referring to FIG. 1, in some examples, the simplification module 130 can scan a program code for linearizable data structures. For example, the program code may contain one or more data structures that are linearizable. In some examples, the simplification module 130 detects the linearizable data structures in the program code and simplifies these structures in the heap model of the program code. The heap of a program code can also be bounded using various forms of summarizations. A summarization, as used herein, refers to a compile time representation of one or more runtime heap objects. For example, two such summarizations may include the use of allocation sites and/or access paths. If a heap of the program code is modeled using allocation sites, then any allocation sites enclosed within a linearizable data structure may not be modeled. In the same manner, if the heap of a program code is modeled using access paths, then such access paths are to be restricted to the interface of any linearizable data structure. In some examples, the simplification module 130 can save the resulting simplified heap model to a new file on a storage device.

In some examples, the analyzer module 132 can use the new file containing the simplified heap model for analysis of the program code. For example, the program code can be analyzed statically for security before the code is deployed and executed by end users. Thus, by analyzing a simplified heap model rather than the original heap model, the present techniques provide a reduction in processing resources. Furthermore, analyzing the simplified heap model results in improved accuracy of analysis due to reduction in the chance of errors generally occurring when analyzing concurrent methods.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the modeling module 128, simplification module 130, and analyzer module 132 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the modeling module 128, simplification module 130, and analyzer module 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
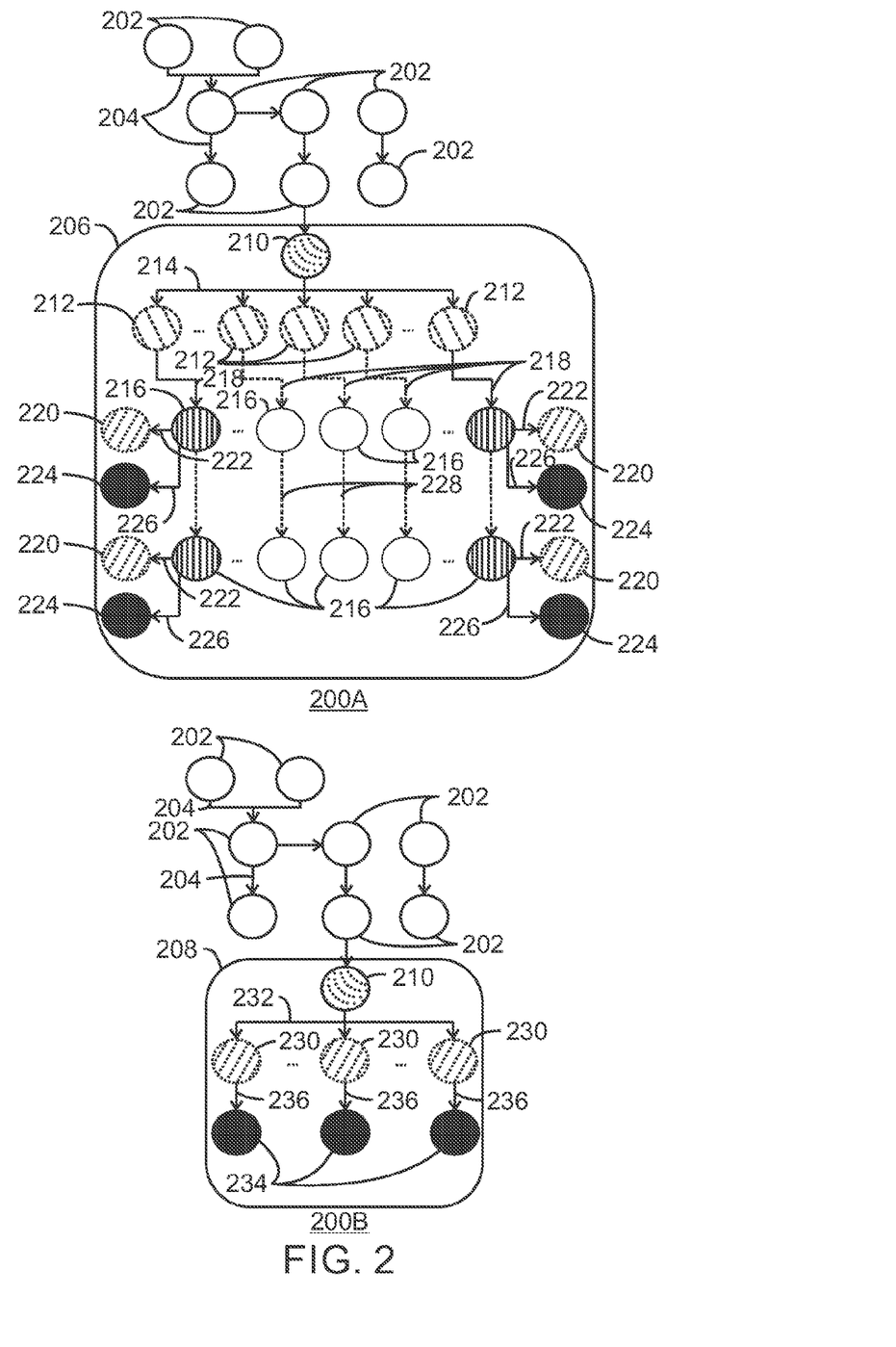
FIG. 2 illustrates an example simplified heap model using allocation sites.

FIG. 2 is an example simplified heap model using allocation sites. An example heap model is referred to generally by the reference number 200A, while an example simplified heap model is referred to generally by the reference number 200B.

In FIG. 2, heap model 200A includes various linked entries 202 that are connected via links 204. Map state 206 includes linked entries that are linearizable. A map 210 is linked to a plurality of buckets 212 via links 214. The buckets 212 are connected to a plurality of linked entries 216 via links 218. Each linked entry has an associated key 220 as indicated by arrow 222 and an associated value 224 as indicated by arrows 226. The linked entries 216 are further connected to other linked entries 216 via links 228. Simplified heap model 200B also includes linked entries 202 connected by links 204. However, in simplified heap model 200B, a map 210 is connected directly to associated keys 230 via links 232. Each associated key 230 is further connected to an associated value 234 via a field 236.

In the example heap model of 200A, the map state 206 is a concrete representation of the map object 210 as a complex heap structure. For example, the map object 210 may be an instance of the class ConcurrentMap. The map object 210 is represented as a set of linked entries 216 having associated keys 220 and values 224.

In the simplified heap model 200B, instead of explicitly modeling the internal state of the map object 210 using linked entries 216, abstract objects representing the keys 230 and values 234 themselves are used. An internal state, as used herein, refers to memory owned by the data structure, such as the array of key/value pairs maintained by the map object 210. In the example simplified heap model of 200B, the keys 230 and values 234 can be connected directly via fields 236 extending between the keys 230 and the values 234. Thus, a simpler representation of the map object 210 can be produced by representing the linearizable map object 210 using abstract objects representing keys 230 and values 234.

It is to be understood that the diagram of FIG. 2 is not intended to indicate that the example heap models 200A and 200B are to include all of the components shown in FIG. 2. Rather, the heap models 200A and 200B can include fewer or additional components not illustrated in FIG. 2 (e.g., additional linked entries, maps, buckets, keys, or values, etc.).

Figure 3:
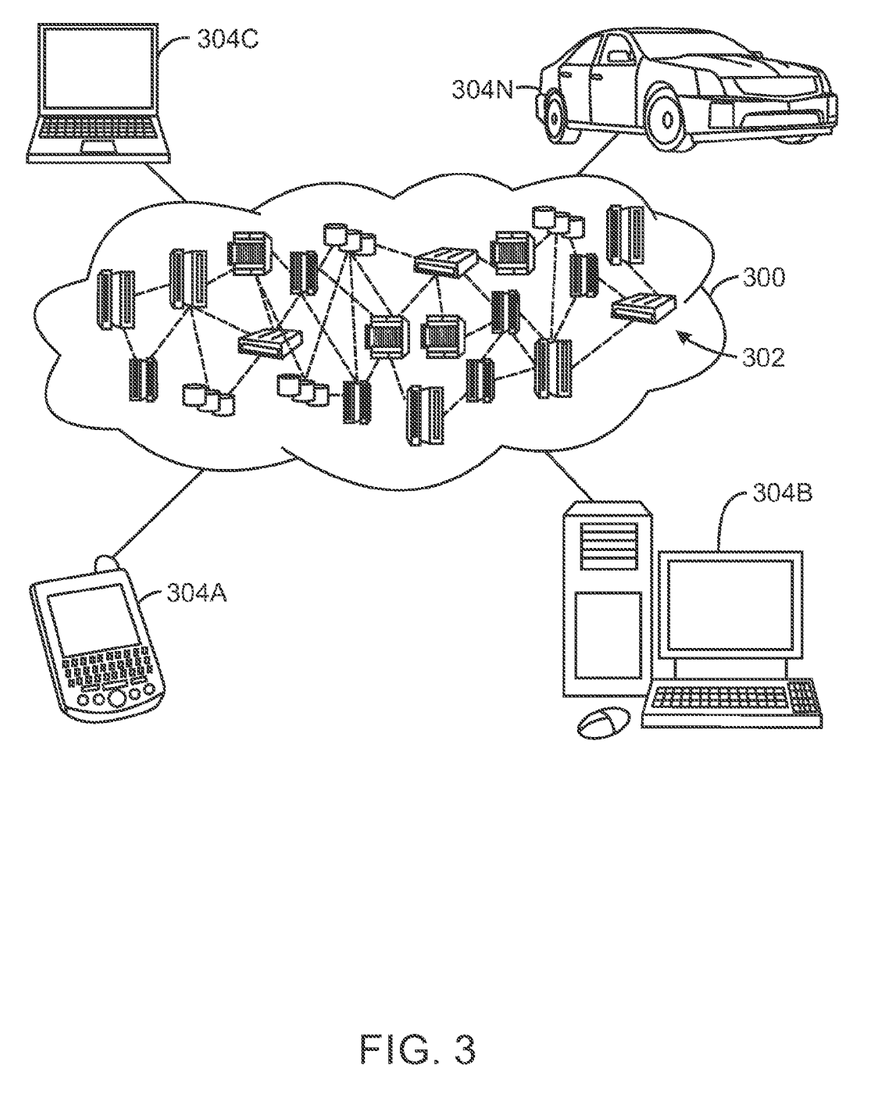
FIG. 3 is an example cloud computing environment according to embodiments described herein.

Referring now to FIG. 3, illustrative cloud computing environment 300 is depicted. As shown, cloud computing environment 300 comprises one or more cloud computing nodes 302 with which local computing devices used by cloud consumers, such as, for example, personal digital assistant (PDA) or cellular telephone 304A, desktop computer 304B, laptop computer 304C, and/or automobile computer system 304N may communicate. Nodes 302 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 304A-N shown in FIG. 3 are intended to be illustrative only and that computing nodes 302 and cloud computing environment 300 can communicate with any type of computerized device over any type of network and/or network addressable connection (e.g., using a web browser).

Figure 4:
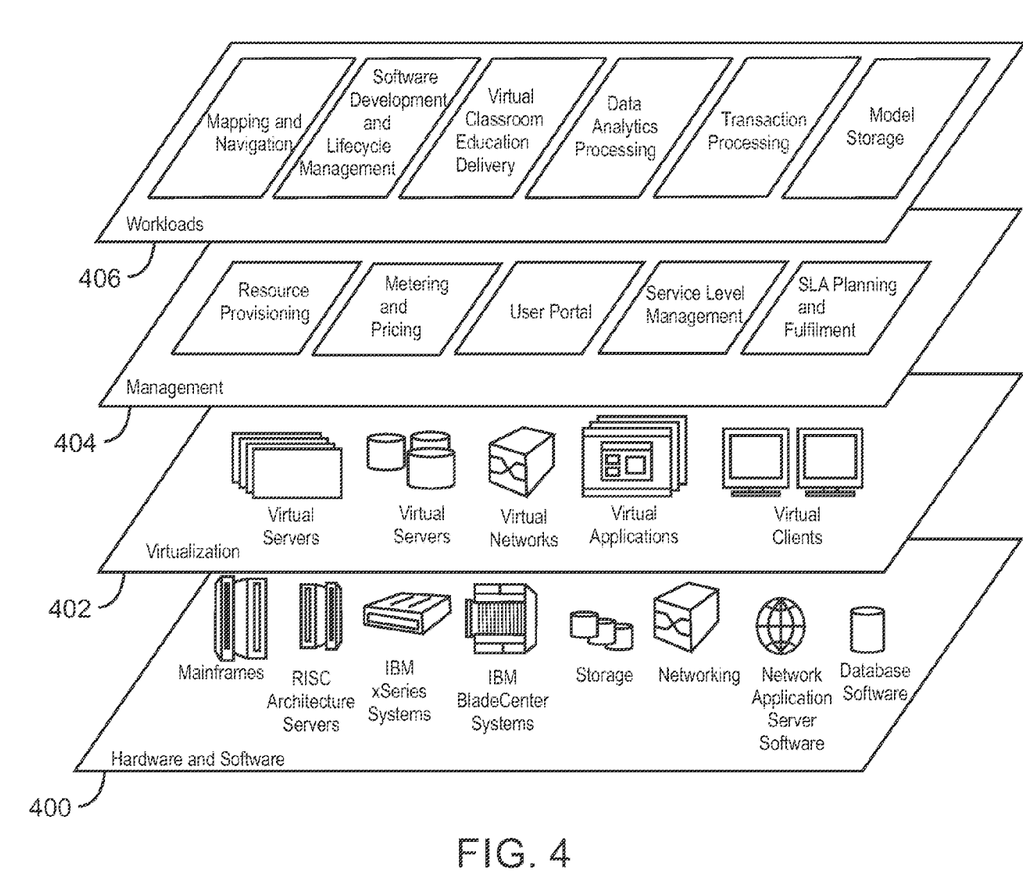
FIG. 4 depicts example abstraction model layers according to embodiments described herein.

Referring now to FIG. 4, a set of functional abstraction layers provided by cloud computing environment 300 (FIG. 3) is shown. It should be understood in advance that the components, layers, and functions shown in FIG. 4 are intended to be illustrative only and are not to be construed as limiting. As depicted, the following layers and corresponding functions are provided.

Hardware and software layer 400 includes hardware and software components. Examples of hardware components include, but are not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include, but are not limited to, network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 402 provides an abstraction layer from which the following non-limiting examples of virtual entities may be provided: virtual servers; virtual storage; virtual networks, including virtual private networks; virtual applications and operating systems; and virtual clients. In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and model storage.

Figure 5:
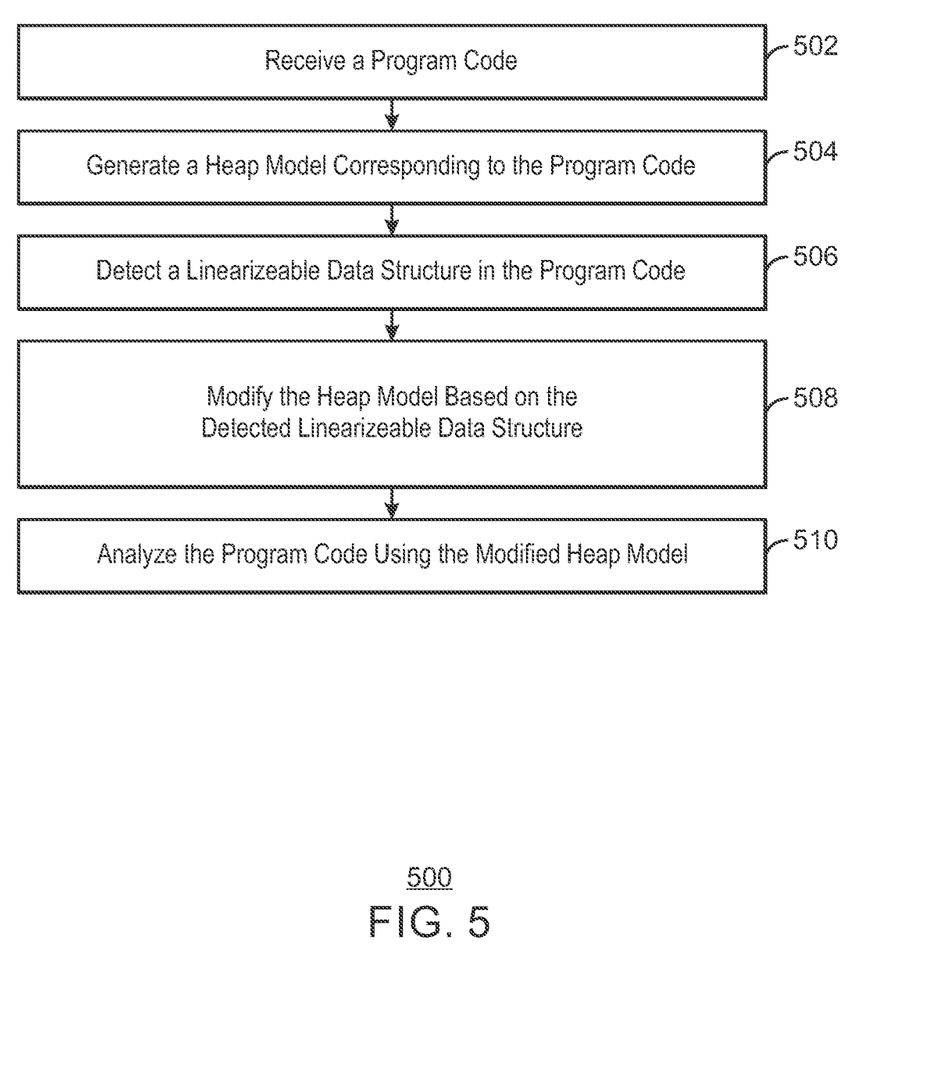
FIG. 5 is a process flow diagram of an example method that can model heaps based on linearizable program code.

FIG. 5 is a process flow diagram of an example method that can model heaps based on linearizable program code. The method 500 can be implemented with any suitable computing device, such as the computing device 100 of FIG. 1 and is discussed with reference to FIG. 2.

At block 502, the modeling module 128 receives a program code. In some examples, the program code can be source code. For example, the program code can be written in any programming language. In some examples, the program code can be object code. For example, a source code may be compiled into an object code that is then to be modeled accordingly. In some embodiments, the modeling module 128 can receive the program code from an external computing device, an application on a local computing device, or a hardware component on a local computing device, among others.

At block 504, the modeling module 128 generates a heap model corresponding to the program code. For example, a heap model can be created via static analysis of the program code. The modeling module 128 can generate a finite over-approximation of heap objects, as well as their connectivity, via fields. For example, the finite over-approximation can be generated by creating abstractions of runtime objects and over-approximating the set of objects each abstract object represents as well as the connectivity between the abstract objects. In some examples, the modeling module 128 can generate a heap model using allocation sites such as in example 200A of FIG. 2. In some examples, the modeling module 128 can generate a heap model using access paths. For example, a heap may be modeled as a collection of access paths. An access path can include a root pointer variable, followed by a string of structure field variables. Properties of the heap may be stored as relations of access paths in the heap model. Alternatively, in some examples, the collection of access paths may also be stored in the heap model along with objects. Thus, an access path can be a local variable, followed by a sequence of field identifiers, which together describe a heap object. For example, given [x=new X( ); y.f=x;], then the object allocated in the first statement can be represented by the following two access paths: {x, y.f}. In some examples, one or more the field identifiers may be empty.

In some examples, the heap model can be stored into a data store. In some examples, the heap model can be storeless (i.e. not stored), the heap model to be generated for each analysis.

At block 506, the simplification module 130 detects a linearizable data structure in the program code. The simplification module 130 can search the program code for data structures that the program code defines and/or uses. Then, for each detected data structure, the simplification module 130 can perform a linearizability check. For example, the linearizable data structures can include two or more methods that may be executed concurrently during execution of a program. In some examples, the simplification module 130 can include any appropriate linearizability detection tool that can detect linearizable data structures in the program code.

At block 508, the simplification module 130 modifies the heap model based on the detected linearizable data structure. For example, if a data structure is detected to be linearizable, then a heap model can be modified based on the internal state of the data structure. For allocation site embodiments, allocation sites enclosed in a data structure may not be included in a simplified heap model. For example, the simplified heap model may be represented by abstract objects representing keys and values such as example simplified heap model 200B of FIG. 2 above. For access path embodiments, the access paths in a simplified heap model may be restricted to the interface of a data structure. For example, the simplification module 130 can replace complex access paths like m.bucketList.iterator.next.value with m.key_K, where K is the actual key. In some examples, the simplified heap model can also be stored into a data store.

At block 510, the analyzer module 132 analyzes the program code using the modified heap model. In some examples, the new file including modified heap model can be used to statically analyze the program code more efficiently. For example, security analysis may be performed using the new file. In some examples, untrusted data may flow into a map object 210 as the value corresponding to a given key. Tracking the untrusted value throughout the concrete map representation 200A may be complicated as there are many internal fields and data structures. However, if the map object 210 is simply represented as a set of key 230 and value 236 pairs, then the analysis simply has to find where the value 236 is read via access to the key 230. For example, the analyzer module 132 can find where the value 236 is read via a Map.get( . . . ) operation.

Other applications that may benefit from more efficient static analysis include program understanding, program refactoring, verification, debugging, enhancing security, improving performance, compile time garbage collection, instruction scheduling, and parallelization, etc.

The process flow diagram of FIG. 5 is not intended to indicate that the operations of the method 500 are to be executed in any particular order, or that all of the operations of the method 500 are to be included in every case. For example, other forms of summarization may be used in alternatively or in addition to the two types described above. Additionally, the method 500 can include any suitable number of additional operations.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
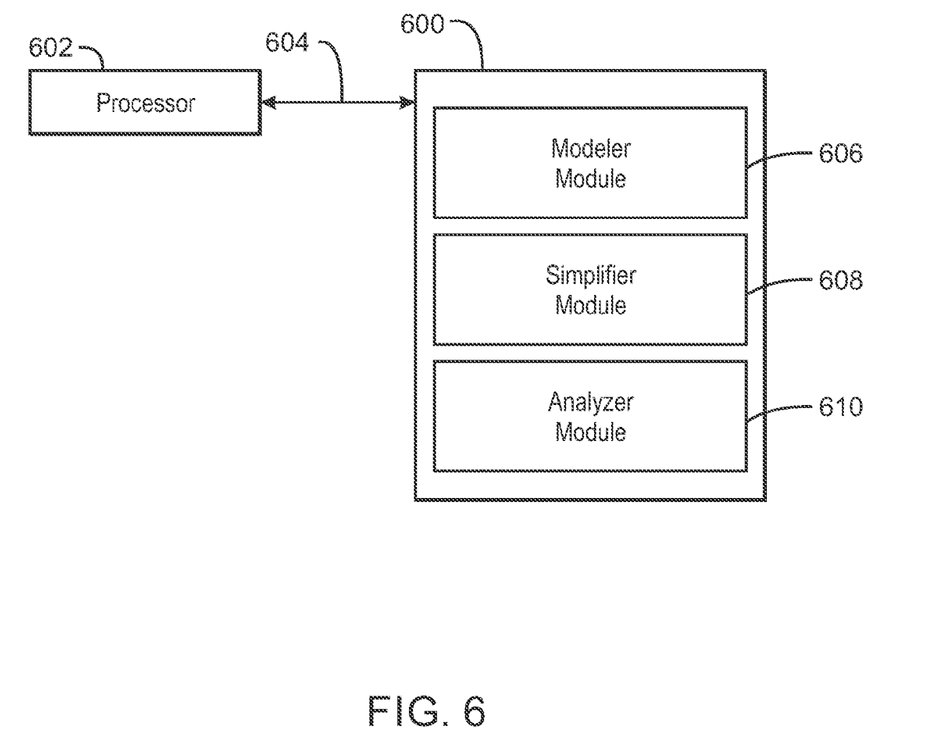
FIG. 6 is an example processing system having tangible, non-transitory computer-readable medium that can model heaps based on linearizable program code.

Referring now to FIG. 6, a block diagram is depicted of an example processing system having tangible, non-transitory computer-readable medium 600 that can model heaps based on linearizable program code. The tangible, non-transitory, computer-readable medium 600 may be accessed by a processor 602 over a computer interconnect 604. Furthermore, the tangible, non-transitory, computer-readable medium 600 may include code to direct the processor 602 to perform the functions described herein.

The various software components discussed herein may be stored on the tangible, non-transitory, computer-readable medium 600, as indicated in FIG. 6. For example, a modeler module 606 includes code to receive a program code. The modeler module 606 also includes code to generate a heap model corresponding to the program code. A simplifier module 608 includes code to detect a linearizable data structure in the program code. The simplifier module 608 includes code to modify the heap model based on the detected linearizable data structure. The simplifier module 608 also includes code to save the modified model of the program code to a new file. The analyzer module 610 includes code to analyze the program code statically using the modified heap model.

In some examples, the simplifier module 608 includes code to model a heap of the program code using allocation sites. The simplifier module 608 can also include code to model a heap of the program code using access paths. An access path can be a local variable followed by a sequence of field identifiers. The simplifier module can include code to modify the heap model by removing allocation sites that are included in the detected linearizable data structure. The simplifier module 608 can also include code to modify the heap model using access paths by removing pointers pointing inside detected linearizable data structures and replacing them with pointers pointing to interfaces of the detected linearizable data structures.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system comprising:
a memory having executable instructions stored thereon; and
a processor coupled to the memory and configured to execute the instructions to:
receive a program source code;
generate, by performing a static analysis of the program source code, a heap model corresponding to the program source code, wherein the heap model comprises object allocation sites;
detect, by performing the static analysis of the program source code, a linearizable data structure in the program source code, wherein at least one of the object allocation sites is associated with the linearizable data structure;
modify, by performing the static analysis of the program source code, the heap model based on the detecting the linearizable data structure, wherein the processor is further configured to execute the instructions to modify the heap model by removing, from the heap model, an object allocation site included in the at least one of the object allocation sites associated with the linearizable data structure; and
analyze the program source code by performing the static analysis of the program source code using the modified heap model.

2. The system of claim 1, wherein the object allocation site removed from the heap model is enclosed in the linearizable data.

3. The system of claim 1, wherein the static analysis of the program source code comprises a security analysis.

4. The system of claim 1, wherein the heap model comprises a static heap.

5. The system of claim 1, wherein the program source code comprises assembly programming language instructions.

6. A computer program product for modeling linearizable data structures, the computer program product comprising a computer-readable storage medium having computer readable instructions embodied therewith, wherein the computer readable storage medium is not a transitory signal per se, the computer readable instructions executable by a processor to cause the processor to:
   receive a program source code;
   generate, by performing a static analysis of the program source code, a heap model corresponding to the program source code, wherein the heap model comprises object allocation sites;
   detect, by performing the static analysis of the program source code, a linearizable data structure in the program source code;
   modify, by performing the static analysis of the program source code, the heap model based on the detecting the linearizable data structure, wherein at least one of the object allocation sites is associated with the linearizable data structure, and wherein the modifying the heap model comprises removing, from the heap model, an object allocation site included in the at least one of the object allocation sites associated with the linearizable data structure;
   save the modified heap model to a new file; and
   analyze the program source code by performing the static analysis of the program source code using the modified heap model.

7. The computer program product of claim 6, wherein the object allocation site removed from the heap model is enclosed in a linearizable data structure.

8. The computer program product of claim 6, wherein the static analysis of the program source code comprises a security analysis.

9. The computer program product of claim 6, wherein the heap model comprises a static heap.

10. The computer program product of claim 6, wherein the program source code comprises assembly programming language instructions.

11. A system for analyzing a program source code, the system comprising:
    a memory having executable instructions stored thereon; and
    a processor coupled to the memory and configured to execute the instructions to:
    receive a program source code at the processor;
    generate, by performing a static analysis of the program source code, a heap model corresponding to the program source code, wherein the heap model comprises object access paths;
    detect, by performing a static analysis of the program source code, a linearizable data structure in the program source code, wherein at least one of the object access paths is associated with the linearizable data structure;
    modify, by performing the static analysis of the program source code, the heap model based on the detecting the linearizable data structure, wherein modifying the heap model comprises replacing a first object access path and a first pointer, wherein the first object access path is included in the at least one of the object access paths associated with the linearizable data structure, wherein the replacing the first object access path comprises replacing, in the modified heap model, the first object access path with an interface of the linearizable data structure, wherein the first pointer points inside the linearizable data structure and a second pointer points to an interface of the linearizable data structure, and wherein the replacing the first pointer comprises replacing, in the modified heap model, the first pointer with the second pointer; and
    analyze the program source code by performing the static analysis of the program source code with the modified heap model.

12. The system of claim 11, wherein a second object access path comprises a local variable followed by one or more field identifiers, and wherein the second object access path is included in the object access paths comprising the heap model.

13. The system of claim 11, wherein the first object access path comprises a complex access path.

14. The system of claim 11, wherein the program source code comprises assembly programming language instructions.

15. The system of claim 11, wherein the static analysis of the program source code comprises a security analysis.

* * * * *